Patented Jan. 6, 1948

2,434,110

UNITED STATES PATENT OFFICE 2,434,110

PROCESS FOR HYDRATING OLEFINIC ALDEHYDES

Lewis F. Hatch, Austin, Tex., and Theodore W. Evans, Oakland, Calif., assignors to Shell Development Company, San Francisco, Calif., a corporation of Delaware No Drawing. Application August 24, 1942, Serial No. 456,124

12 Claims. (Cl. 260—602)

This invention relates to a process for the hydration, and to the hydration and subsequent hydrogenation, of alpha olefinic aldehydes, in particular, aldehydes of the formula

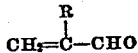

It also relates to the condensation and/or polymerization of such substances and to the hydrogenation of the resulting products.

A preferred embodiment of the invention comprises effecting the simultaneous hydration and condensation of acrolein, preferably in the presence of a hydration catalyst such as dilute sulfuric acid, followed by the catalytic hydrogenation of one of more of the organic constituents of the reaction mixture, such constituents comprising hydracrylic aldehyde, unreacted acrolein, and their polymerization and condensation products. This hydrogenation step, which again may be accompanied by condensation, produces valuable polyhydroxy compounds such as trimethylene glycol and 1,5-dihydroxy, 2-methylol pentane (from two molecules of acrolein), and n-propyl alcohol as well as other saturated condensation and polymerization products.

The substances particularly applicable as starting materials for the present process are acrolein and related compounds represented by the formula

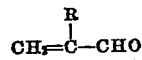

wherein R represents a hydrogen atom or an organic radical, for example, an alkyl, aryl, alkenyl, aralkyl, alkaryl, cycloalkyl, cycloalkenyl, alicyclic or heterocyclic radical such as methyl, ethyl, propyl, butyl, pentyl, hexyl, heptyl, octyl, nonyl, decyl, isopropyl, isobutyl, isoamyl, vinyl, propenyl, butenyl, pentenyl, hexenyl, phenyl, benzyl, styryl, cyclopentyl, cyclopentenyl, cyclohexenyl, cycloheptenyl, cyclohexyl, cycloheptyl and the like, which may be further substituted with such radicals as amino, hydroxy, halide, etc.

This whole class of alpha olefinic aldehydes which constitute the starting material for the present process is characterized by the presence of an aldehyde double bond which is in conjugate relation to a carbon-to-carbon double bond. Such compounds, due to this structure, are particularly reactive and especially notable for their ease of polymerization. This tendency is increased when the carbon-to-oxygen double bond is in conjugate relation to a terminal methylene group as in the compounds which form the subject matter of the present invention.

It has now been found, however, that these above defined alpha olefinic aldehydes may be converted to a number of valuable saturated organic compounds by the process of hydration and hydrogenation. It has also been found that a number of the hydrogenated condensation products of the aldehydes are valuable substances and, further, that the amount of polymerization taking place in connection with the hydration and hydrogenation of these aldehydes may be restrained within reasonable limits. As one step in the production of polyhydroxy compounds according to the invention, it has further been found that the hydration of unsaturated aldehydes may be advantageously effected in the presence of an acidic hydration catalyst. This was quite unexpected since such reagents are commonly employed in the dehydration of hydroxy aldehydes, and it would also be expected that such acidic components would greatly accelerate the polymerization of the alpha olefinic aldehydes which contain a terminal methylene group.

For the hydration catalyst, any substance which produces hydrogen ions in aqueous medium may be employed. The concentration, of course, must be adjusted according to the strength of the acidic agent; for a highly reactive substance such as hydrochloric acid, only a dilute solution would be employed, while when employing a weakly acid reagent, such as acetic acid, a greater concentration would be used. Such acids as sulfuric, hydrochloric, hydrofluoric, phosphoric, oxalic, tartaric, acetic, as well as acid salts, sulfonic acids and the like may be utilized for this purpose.

When employing such a reagent as dilute sulfuric acid as the acidic catalyst, it is preferred to use acid concentrations of less than about ten per cent. More particularly, at a temperature in the range of 75° C. to 100° C., a sulfuric acid concentration of one-half to one per cent by weight has been found to have excellent results. This range is especially favorable for the hydration of acrolein and methacrolein. However, even more dilute concentrations may be used advantageously. In general, for the hydration of this whole group of alpha olefinic aldehydes, an acidic agent in such concentration as to produce a pH from about 0.5 up to about 7 gives particularly favorable results. Optimum conditions, of course, may vary from one starting material to another. The reaction can be carried out at ordinary room temperature or lower. However, it has been found that a small elevation of temperature may favor the hydration over the polymerization reaction.

In hydrating acrolein and/or methacrolein, it is preferred to employ dilute sulfuric acid as the catalyst. It has now been found that with a sulfuric acid concentration of about one per cent by weight and a weight ratio of water to acrolein of 78 to 22, the hydration will, at a temperature of about 75° C., reach an equilibrium point at about 80% conversion in a period of about two hours.

For concentrations of acrolein in the range of about five to about thirty weight per cent at a temperature between about 75° C. and 100° C., equally satisfactory conversions are attained in a time of under about three hours.

A longer reaction period, as well as greater acid concentrations and higher temperatures, results in increased condensation. For lower concentrations of acid and/or lower temperatures, a correspondingly longer reaction time should be employed. The effect of temperature on the speed of hydration of acrolein is illustrated by the following comparable runs:

| | ° C. |
|---|---|
| 50% hydration in 8 hours | 50 |
| 53% hydration in 1 hour | 75 |
| 53% hydration in ½ hour (polymerization extensive) | 100 |

A polymerization inhibitor or anti-oxidant, for example, a phenolic compound such as hydroquinone, may, if desired, be added to retard condensation of the treated unsaturated aldehyde. However, as pointed out below, a number of these condensation products may be desirable substances. As the molecular weight of the unsaturated aldehyde increases, it may be desirable to add a mutual solvent such as dioxane to the reaction mixture in order to increase the water solubility of the starting material for the hydration process.

If one wishes to recover the hydracrylic aldehyde or its analogue, as such, rather than to hydrogenate the whole reaction mixture as by the process herein described, the strength of the sulfuric acid may be decreased by the addition of the salt of a weak acid which will form an insoluble sulfate (for example, barium acetate), the precipitated sulfate may then be filtered off, the unreacted acrolein and water distilled off together under reduced pressure, and the hydracrylic aldehyde separated from the polymerized material. The acid could, of course, be neutralized with a basic reagent, but the Michael poly-condensation takes place in the presence of alkali so that if these condensation products are not desired, the neutralization may conveniently be carried out as just described or by the very careful use of alkali.

However, it has been found that this whole hydration reaction mixture may be advantageously hydrogenated in the presence of a hydrogenation catalyst to produce simultaneously a number of valuable products. Any of the hydrogenation catalysts known to the art may be utilized with varying degrees of effectiveness. Of those which are especially adapted for such work, Raney's nickel and Adkin's copper-chromium oxide are very efficacious from the viewpoint of both cost and efficiency. Other suitable hydrogenation catalysts are those consisting of or comprising one or more metals, or catalytically active compounds of metals, such as Fe, Co, Cu, Pd, Zr, Ti, Th, V, Ta, Ag, Mo, Al and the like. For this hydrogenation, it is preferred to use a temperature not substantially greater than about 100° C. and any convenient hydrogen pressure up to about 5000 lbs./in.² For example, at 1000 lbs./in.² pressure using Raney's nickel catalyst, the acrolein reaction mixture can be fully hydrogenated at 80°–100° C. in a period of 30 minutes; at 35°–40° C. the corresponding time is four hours at the same pressure. Instead of hydrogenating the whole reaction mixture, the unreacted unsaturated aldehyde used as starting material may first be separated for recycling to the hydration reaction, if desired, and/or one or more of the reaction products may be separated and hydrogenated under the foregoing conditions. At the conclusion of the hydrogenation, if Raney nickel catalyst has been employed, the pH may be brought to 7.0 to precipitate dissolved nickel, and the constituents of the mixture separated by any convenient means, as for example by distillation and condensation at an appropriate pressure.

The unreacted acrolein of the mixture is hydrogenated by this process to n-propyl alcohol, a substance which finds use as a solvent for resins and cellulose esters, etc.

The hydracrylic aldehyde is hydrogenated to trimethylene glycol, a compound which may be utilized in the formation of alkyd or glyptal type resins, as a plasticizer, "anti-freeze," hydraulic fluid, solvent, in numerous chemical syntheses such as a starting material in the preparation of cyclopropane or various esters, as a coupling agent having both polar and non-polar characteristics, and the like. Trimethylene glycol can be identified by its acetyl value and by the melting point of the dibenzoate.

Another hydrogenation product produced by this process from the acrolein reaction mixture is 1,5-dihydroxy, 2-methylol pentane [CH₂OH (CH₂)₂ CH (CH₂OH)₂] which may also be used as a solvent, plasticizer, precursor of glyptal type resins, etc. Still another product of the reaction is trimethylene glycol ether.

The various hydroxy polyaldehydes formed by the Michael polycondensation of acrolein and its homologues [J. A. C. S. 60:1737, 1911 (1938)] may also be present in small proportions in this reaction mixture and these are likewise hydrogenated to the corresponding saturated polyhydroxy compounds.

These various compounds may be separated from the reaction mixture by fractional distillation at suitable pressures and/or other suitable procedures.

Other hydrogenated condensation compounds which form resinous products ("still bottoms") are produced in the process. Likewise, all non-aromatic, unsaturated linkages in the acrolein derivatives are hydrogenated by this process.

Various phases of the invention may be illustrated by the following examples. The hydration was effected in pressure vessels (under autogenous pressure) in which the subsequent hydrogenation was then effected at the pressures noted.

*Example I*

5.37 mols of acrolein in 12.9 times the number of mols of water (21.2% acrolein by weight) were reacted with 0.5 weight percent sulfuric acid for 8 hours at 70–80° C. 5 g. of hydroquinone were also present. 83.8% of the acrolein had reacted at the end of this time as determined by the bromine number run at 0° C. The reaction mixture was then hydrogenated in the presence of Raney's nickel catalyst for 5 hours at 32–40° C. and a pressure of 1000 lbs./in.² The yields were 12.3% n-propyl alcohol (2.8% acrolein was removed before hydrogenation), 24.4% trimethylene glycol, 26.2% 1,5-dihydroxy 2-methylol pentane and 22% still bottoms. The total yield of trimethylene glycol and 1,5-dihydroxy 2-methylol pentane, based on the amount of acrolein hydrated, was 60.6%.

*Example II*

Ten weight percent of acrolein in water was reacted with 0.5 weight percent sulfuric acid for 2 hours at 75° C. in the presence of 3 g. hydroquinone per 100 g. acrolein. In this time, 52% of the acrolein had been reacted. The mixture was then hydrogenated, as before, for 1.25 hours at 78–84° C. The yield was 36% n-propyl alcohol and—based on the acrolein hydrated—65.5% trimethylene glycol, 3.2% 1,5-dihydroxy 2-methylol pentane and 31.1% still bottoms.

*Example III*

Ten weight percent aqueous acrolein was hydrated with one weight percent sulfuric acid for 2 hours at 75° C. with 2 g. hydroquinone per 100 g. acrolein present. 77% of the acrolein reacted. The mixture was then hydrogenated for 1 hour at 79–88° C. and 1000 lbs./in.² The yield was 16.1% n-propyl alcohol and—based on the acrolein hydrated—43.1% trimethylene glycol, 12.9% 1,5-dihydroxy 2-methylol pentane and 27.2% still bottoms.

We claim as our invention:

1. A process for the production of 2-methyl propanol-3-al which comprises reacting α methylacrolein with water in the presence of an acidic hydration agent.

2. A process for the production of 2-methyl propanol-3-al which comprises reacting α methylacrolein with a dilute aqueous solution of sulfuric acid.

3. A process for the production of hydracrylic aldehyde which comprises reacting acrolein with water in the presence of an acidic hydration agent.

4. A process for the production of hydracrylic aldehyde which comprises reacting acrolein with a dilute aqueous solution of sulfuric acid.

5. A process which comprises reacting with water in the presence of an acidic hydration catalyst, an alpha mono olefinic aldehyde having a terminal methylene group, the reaction being continued until a substantial amount of the corresponding monohydroxy aldehyde has been formed.

6. A process which comprises reacting with water in the presence of dilute sulfuric acid, an olefinic aldehyde having a terminal methylene group, the double bond of which is in conjugate relation to the carbon-oxygen bond of the aldehyde group, the reaction being continued until a substantial amount of the corresponding monohydroxy aldehyde has been formed.

7. A process which comprises reacting with water in the presence of an acidic hydration catalyst having a pH in the reaction mixture of from about 0.5 to about 7, an olefinic aldehyde having a terminal methylene group, the double bond of which is in conjugate relation to the carbon-oxygen bond of the aldehyde group, the reaction being continued until a substantial amount of the corresponding monohydroxy aldehyde has been formed.

8. A process which comprises reacting with water in the presence of an acidic hydration catalyst, an alpha olefinic aldehyde having a terminal methylene group, the reaction being continued until a substantial amount of hydroxy aldehyde has been formed.

9. A process for the production of hydracrylic aldehyde which comprises heating an aqueous solution containing about 5% to about 30% of acrolein and about 0.5% to about 1% of sulfuric acid at about 75° C. to 100° C. for a period under three hours.

10. A process for the production of a hydroxy aldehyde which comprises heating an aqueous solution containing about 5% to about 30% of a water-soluble aliphatic mono-olefinic aldehyde having a terminal methylene group and about 0.5% to about 1% of sulfuric acid at about 75° C. to 100° C. for a period under three hours in the presence of hydroquinone.

11. A process for the production of a hydroxy aldehyde which comprises heating a mixture of water and an aliphatic alpha mono-olefinic aldehyde having a terminal methylene group wherein the aldehyde is present in an amount corresponding to about 5% to about 30% by weight of the water with sufficient acid to maintain the pH of the reaction mixture between about 0.5 and 7, at a temperature not greater than 100° C. for 0.5 to 8 hours in the presence of a phenolic anti-oxidant.

12. A process for the production of a hydroxy aldehyde which comprises heating a mixture of water and an aliphatic alpha-monoolefinic aldehyde having a terminal methylene group and an acid wherein the amount of said aldehyde is between about 5% and about 30% by weight of the water and the acid is at least 0.5% but less than 10% of the weight of the water for 0.5 to 8 hours at a temperature not greater than 100° C.

LEWIS F. HATCH.
THEODORE W. EVANS.

REFERENCES CITED

The following references are of record in the file of this patent:

UNITED STATES PATENTS

| Number | Name | Date |
|---|---|---|
| 1,961,980 | Mueller-Cunradi | June 5, 1934 |
| 2,271,083 | Lorand | Jan. 27, 1942 |

OTHER REFERENCES

Neuberg, "Biochemische Zeitschrift," vol. 221, pp. 492–493 (1930); vol. 225, pp. 1 to 5 (1932).

Beilstein, "Handbuch der Organischen Chemie," vol. 1, p. 820 (Abstract of article by Nef in "Annalen der Chemie").

Ellis, "Chemistry of Petroleum derivatives," pp. 300–301.